United States Patent

[11] 3,614,210

[72] Inventor Sandor Caplan
 Trenton, N.J.
[21] Appl. No. 874,524
[22] Filed Nov. 6, 1969
[45] Patented Oct. 19, 1971
[73] Assignee RCA Corporation

[54] LIQUID CRYSTAL DAY/NIGHT MIRROR
 6 Claims, 3 Drawing Figs.
[52] U.S. Cl. .................................................. 350/278,
 350/160 R
[51] Int. Cl. ..................................................... G02b 5/08,
 G02b 1/28
[50] Field of Search .......................................... 350/160
 LC, 278, 281

[56] References Cited
 UNITED STATES PATENTS
2,631,498 3/1953 Barkley ........................ 350/281
3,280,701 10/1966 Donnelly et al ............... 350/278 X
3,499,112 3/1970 Heilmeier et al. ............ 350/160 X
3,499,702 3/1970 Goldmacher et al. ........ 350/160 X

OTHER REFERENCES

" Two-day Liquid Crystal Workshops" (Folder) by Pennsylvania State University, 4 pages, Effective date of July, 1969. 350-278.

Primary Examiner—John K. Corbin
Attorney—Glenn H. Bruestle

ABSTRACT: The mirror comprises front and rear substrates sandwiching a liquid crystal material therebetween. The front substrate is transparent and has, on its inner surface, a transparent electrode. The rear substrate has, on its inner surface, a metallic electrode having a specular surface. In use, the mirror is mounted relative to a viewer such that images reflected from both the outer surface of the front substrate and the specular surface will reach the viewer. Terminal means are provided for applying a voltage between the electrodes for selectively switching the liquid crystal material between transparent and light-scattering states. Means are provided for obtaining a mirror having a relatively low diffuse reflectance.

PATENTED OCT 19 1971  3,614,210

INVENTOR
Sandor Caplan
BY M. Y. Epstein
ATTORNEY

LIQUID CRYSTAL DAY/NIGHT MIRROR

BACKGROUND OF THE INVENTION

This invention relates to liquid crystal devices, and particularly to a novel mirror structure utilizing a liquid crystal material.

In certain applications, e.g., in automobiles, rear view mirrors are used which have the characteristic of being switchable between high and low degrees of reflectivity. Thus, during daytime use of mirror, the mirror is used in its high reflectivity state to provide optimum brightness and visibility of reflected objects. At nighttime, however, the mirror is used in its low reflectivity state, thereby reducing the brightness of the reflected images for the purpose of preventing blinding of the viewer by bright lights, e.g., the headlights of following automobiles.

In one type of prior art mirror, such as those described in U.S. Pats. No. 3,198,070, issued on Aug. 3, 1965, and 3,259,017, issued on July 5, 1966, the mirror comprises front and rear reflective surfaces of low and high degrees of reflectivity, respectively, the two surfaces being disposed in parallel, spaced-apart relation, and the front surface being substantially transparent. A reservoir of an opaque fluid is used, and means are provided for moving the fluid inwardly and outwardly of the space between the two surfaces. When the space is filled with the opaque fluid, vision of the rear surface is occluded, in which case the front surface of low reflectivity provides the mirror reflection. When the space between the surfaces is emptied of fluid, or the thickness of the fluid film is reduced, the rear surface is visible through the transparent first surface, whereby a much brighter image reflected from the rear surface is visible.

A disadvantage of the described system is that it involves the use of a hydraulic system and attendant moving parts. The resulting complexity and cost of the system has discouraged extensive commercial use thereof.

DESCRIPTION OF PREFERRED EMBODIMENTS

Figure 1:
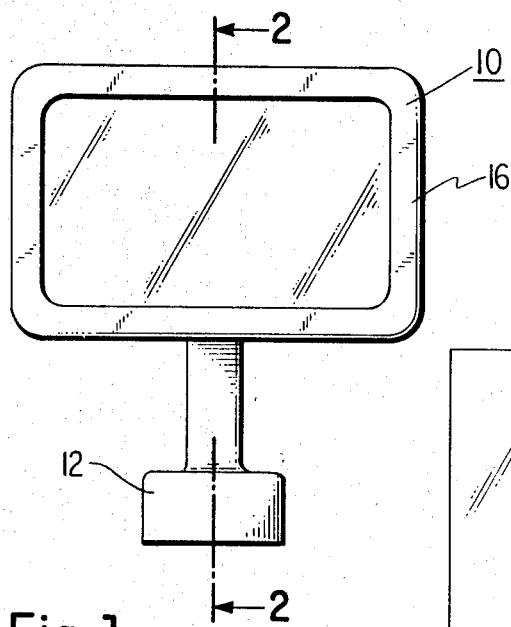
FIG. 1 is a front view of a mirror in accordance with the invention.

With reference to the drawing, a liquid crystal mirror 10 is shown comprising a support member 12 on which is mounted, by means of a swivel knuckle 14, a housing 16. Rigidly mounted within the housing 16, as by being clamped between front and rear portions thereof, is a liquid crystal cell comprising a pair of front and rear rectangular glass substrates 20 and 22, respectively, the substrates having a thickness, for example, of 125 mils. The front substrate 20 is transparent, and comprises a soda lime glass having a light transparency in excess of 95 percent. The two substrates 20 and 22 are maintained in spaced apart relation by means of a shim 24 of an insulating material, e.g., mica.

Disposed between the substrates 20 and 22, and maintained therebetween by the shim 24, as well as by a seal 26 of, e.g., glass frit, extending about the peripheries of the substrates 20 and 22, is a thin film 30, e.g., 0.0005 inch thick, of a liquid crystal material. In the instant embodiment, a nematic liquid crystal composition is used of the type that exhibits turbulent motion upon the passage of current therethrough, for example, the liquid crystal anisylidene-p-aminophenylacetate, having an excess of mobile ions therein.

The film 30 of liquid crystal material is normally substantially transparent to light. However, when an electric field of sufficient magnitude is applied across the film, a current is caused to flow through it. The current flow causes turbulence in the film and places the liquid crystal material in a light-scattering state, i.e., it forward scatters light incident thereon. The scattering of light completely diffuses the light incident on the film 30, thus preventing the transmission of light images therethrough. When the electric field is removed, the liquid crystal returns to its transparent state.

The threshold voltage required to place the liquid crystal material in its light-scattering mode is generally in the range of $0.5 \times 10^4$ to $1 \times 10^4$ volts per centimeter of film thickness.

Examples of other liquid crystal materials and further details concerning the uses thereof are described in U.S. Pat. No. 3,322,485 issued to R. Williams.

The inside surface of 34 of the front substrate 20 is coated with a thin layer 36 of a transparent conductive material, e.g., a 1,000 A. thick layer of tin oxide. The inside surface 38 of the rear substrate 22 is provided with a layer 40 of an electrical conductive material, e.g., a 2,000 A. thick layer of nickel, having a specular surface 42.

In another embodiment, not shown, the electrical conductive layer on the rear substrate is transparent, comprising, for example, tin oxide, and the specular surface is provided by means of a metal layer, e.g., a 2,000 A. thick layer of nickel, on the outside surface of the rear substrate.

Figure 3:
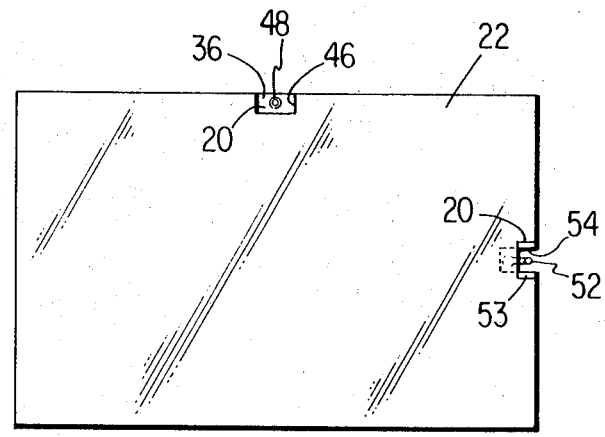
FIG. 3 is a rear view of the liquid crystal cell portion of the mirror of FIG. 1.

For the purpose of providing access to the conductive layer 36, for making an electrical connection thereto, a notch 46 (FIG. 3) is provided through the substrate 22 at the periphery thereof exposing a portion of the substrate 20 and the layer 36 thereon. A lead member 48 is electrically connected to the exposed portion of the layer 36 by means of, for example, an electrically conductive silver epoxy cement. The lead 48 passes outwardly through the housing 16 and through the support member 12.

Figure 2:
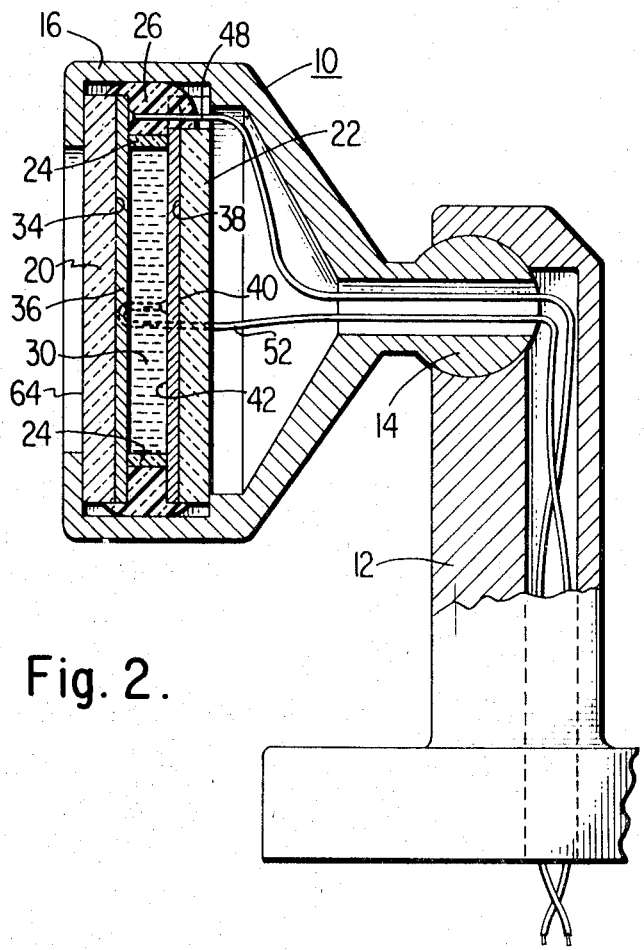
FIG. 2 is a section along line 2—2 of FIG. 1.

A lead member 52 is similarly connected to the conductive layer 40 on the substrate 22 through a peripheral notch 54 (FIG. 3) through the substrate 20. A peripheral notch 53 is also provided in the edge of the substrate 22 allowing passage of the lead 52 rearwardly through the substrate 22. For clarity, the peripheral glass seal 26, shown in FIG. 2, is omitted from FIG. 3.

As noted, the layer 40 has a specular surface 42. Preferrably, for a reason described hereinafter, the surface 42 is not a particularly highly reflective and efficient mirror. Using a layer 40 of nickel, for example, the surface 42 thereof has a reflectivity of 65 percent. The substrate 20, although of transparent glass, has an index of light refraction different from that of air, whereby the front surface 64 of the substrate 20 is also a light reflector, having a reflectivity in the order of 8 percent. Also, depending upon the degree of matching of the indices of light refraction of the substrate 20, the layer 36, and the film 30, some light reflection occurs from the interfaces between these materials. In the instant embodiment, the matching of the refraction indices of these materials is relatively close, whereby the total light reflection from these interfaces is relatively small, e.g., less than 1 percent. As a practical matter, owing to the closeness of these various surfaces, it is difficult to determine from which surface the major reflectivity occurs. In any event, it is substantially less than the reflectivity of the specular surface 42.

In use, the mirror 10 is mounted on a vehicle, e.g., an automobile, in such manner that both the front surface 64 and the rear surface 42 of the mirror are visible to a viewer in the vehicle. For example, the mirror 10 can be mounted in identical fashion as standard mirrors are mounted either inside or outside of automobiles, and the exact adjustment in the positioning of the mirror is made via the swivel knuckle 14. In view of the known mounting of automobile mirrors, illustration of the mounting of the mirror 10 is not provided.

The mirror 10 is operated as follows. When a reduced brightness or attenuated image is desired, as in nighttime use of the mirror, a voltage, either AC, DC, or pulsed DC, is applied between the conductive layers 36 and 40 via the terminal means 48 and 52 to place the liquid crystal material of the film 30 in its light-scattering mode. The liquid crystal film thus becomes blocking of transmission of light images therethrough, whereby reflection of images from the specular surface 42 is prevented. Images are thus reflected only from the outside surface 64 of the substrate 20 and from the interfaces between the substrate 20, the layer 36, and the film 30. Owing to the poor reflectivities of the outside surface and the material interfaces, attenuated brightness images are reflected to the viewer. Since the various interfaces and surface 64 are parallel to one another, and are closely spaced, the presence of the multiple reflected images is not noticeable, the reflected images appearing as a single image to the viewer.

When maximum brightness reflected images are desired, as in daytime use of the mirror, the liquid crystal film is not energized and remains in its light transparent state. The specular surface 42 is thus visible through the liquid crystal film 30, and bright images are reflected therefrom to the viewer. Although, in this mode of operation of the mirror 10, images are also reflected to the viewer from the front reflective surface 64 and the aforementioned interfaces, the brightness of these images is so much less than the brightness of images reflected from the specular surface 42 that the former are substantially unnoticeable.

As noted, during reduced reflectivity operation of the mirror, i.e., with the film 30 in its light scattering mode, light incident upon the mirror is forward scattered by the film. Most of this light, in the order of 80 percent, with the liquid crystal material of the instant embodiment, passes through the film and reaches the specular surface 42. A portion of this light is reflected back to the film 30 where it is again forward scattered, this time in directions including ones through the front substrate 20. To a viewer, therefore, the surface of the mirror, when the mirror is illuminated and is in its reduced reflectivity mode, has a milky white or luminous appearance. Stated differently, the combination of the light scattering film 30 and the specular surface 42 provides a diffuse reflector, the diffuse reflectance of the overall mirror being dependent primarily upon the optical properties of the film 30 and the surface 42, and secondarily dependent upon the optical properties of the other elements of the mirror. As a result of this diffuse reflectance, the images reflected from the mirror during reduced reflectivity operation of the mirror appear on a luminous white background.

A problem associated with the background luminescence of the mirror arises in the situation where two or more light image sources are present, e.g., the headlights of two automobiles following at different distances. In this case, the light from the closer automobile can give rise to a mirror background luminescence which is so bright as to obscure or extinguish the image of the more distant headlights. Additionally, in some instances, as when the following automobile is extremely close, the mirror luminescence can be so high as to be blinding of the viewer.

To reduce the undesirable background luminescence, the diffuse reflectance of the overall mirror is preferably lower than 45 percent of the diffuse reflectance of standard white, and preferably is about 30 percent of standard white. By a percentage of "standard white" is meant the reflectance of the mirror in comparison with the reflectance from a standard material, e.g., a powder of magnesium carbonate, using a spot-brightness meter.

One means to provide the desired low diffuse reflectance is to use, as in the instant embodiment, a specular surface 42 having a reflectivity significantly less than the reflectivity of standard mirrors. E.g., standard mirrors generally comprise reflective layers of aluminum or silver having reflectivities in excess of 80 percent. In the instant embodiment, using a nickel layer 40 having a specular surface 42 of 65 percent reflectivity, the diffuse reflectance of the overall mirror 10 is 30 percent of standard white. Generally, using a specular surface 42 having a reflectivity of less than 75 percent will provide the desired low mirror diffuse reflectance of less than 45 percent.

In another embodiment, the layer 40 comprises aluminum of silver having a high reflectance, e.g., 80 percent. To reduce the otherwise high diffuse reflectance, e.g., in excess of 45 percent, of such a device, the amount of light reaching the specular surface is reduced. Thus, for example, the front substrate 20 can comprise a darkened glass having a transparency less than 80 percent. The diffuse reflectance of a mirror using a front substrate 20 of, for example, 70 percent transparency, is about 30 percent of standard white.

Alternatively, the transparency of the conductive layer 36 can be reduced to less than 80 percent, as by increasing the thickness thereof or by coating it with a thin, e.g., 100 A. layer of aluminum. Further, other liquid crystal materials, having greater light absorption than the material of the instant embodiment, can be used.

Reducing the diffuse reflectance, it is noted, reduces the overall specular reflectivity of the mirror. With the aforedescribed examples, the reflectivity of the mirror, in the high reflectance mode of operation, is in the order of 50—55 percent. According to present federal standards, automobile mirrors having a reflectivity of at least 50 percent are satisfactory.

I claim:

1. A method of selectively obtaining varied brightness reflected images from a day/night mirror comprising:
   providing a liquid crystal cell comprising a front surface of low reflectivity, a rear surface of high reflectivity, and a liquid crystal material between said surfaces, said material being reversibly switchable between light-transparent and light-scattering states;
   mounting said cell on a vehicle in a manner such that images reflected from both the front and rear surfaces of said cell are visible to a viewer in said vehicle, and
   selectively applying a voltage across said liquid crystal material and removing said voltage for selectively switching said material between said light-transparent and light-scattering states.

2. A liquid crystal day/night mirror comprising:
   front and rear spaced-apart substrates;
   a liquid crystal material sandwiched between said substrates, said material being reversibly switchable between light transparent and light-scattering states;
   said front substrate being transparent and having a transparent electrical conductor on the inside surface thereof, said front substrate including a surface having a first reflectivity;
   an electrical conductor on the inside surface of said rear substrate; and
   a specular surface providing a second reflectivity higher than said first reflectivity on said rear substrate visible through said front substrate when said liquid crystal material is in its transparent state;
   the combination of said specular surface and said liquid crystal material, when said material is in its light scattering state, providing diffuse reflectance of light incident on said mirror, the diffuse reflectance of said mirror being less than 45 percent of standard white.

3. A liquid crystal mirror as in claim 2 wherein said specular surface has a reflectivity less than 75 percent.

4. A liquid crystal mirror as in claim 2 wherein said transparent conductor has a light transparency of less than 80 percent.

5. A liquid crystal mirror as in claim 2 wherein said front substrate has a light transparency of less than 80 percent.

6. A liquid crystal mirror as in claim 2 wherein the specular reflectivity of said mirror is between 50 and 55 percent.